United States Patent
Bartley et al.

(10) Patent No.: US 7,952,478 B2
(45) Date of Patent: May 31, 2011

(54) CAPACITANCE-BASED MICROCHIP EXPLOITATION DETECTION

(75) Inventors: Gerald K Bartley, Rochester, MN (US);
Darryl J Becker, Rochester, MN (US);
Paul E Dahlen, Rochester, MN (US);
Philip R Germann, Oronoco, MN (US);
Andrew B Maki, Rochester, MN (US);
Mark O Maxson, Mantorville, MN (US)

(73) Assignee: International Business Machines Corporation, Armonk, NY (US)

(*) Notice: Subject to any disclaimer, the term of this patent is extended or adjusted under 35 U.S.C. 154(b) by 281 days.

(21) Appl. No.: 12/181,342

(22) Filed: Jul. 29, 2008

(65) Prior Publication Data

US 2010/0026506 A1    Feb. 4, 2010

(51) Int. Cl.
*G08B 13/00*    (2006.01)
(52) U.S. Cl. ............. 340/550; 713/194; 361/730
(58) Field of Classification Search ........... 340/550; 713/194; 361/730
See application file for complete search history.

(56) References Cited

U.S. PATENT DOCUMENTS

| | | | |
|---|---|---|---|
| 4,288,829 A * | 9/1981 | Tango ............................ 361/56 |
| 5,117,457 A * | 5/1992 | Comerford et al. .......... 713/194 |
| 5,177,352 A | 1/1993 | Carson et al. |
| 5,389,738 A * | 2/1995 | Piosenka et al. .............. 174/528 |
| 5,790,670 A | 8/1998 | Bramlett |
| 5,861,652 A * | 1/1999 | Cole et al. ..................... 257/386 |
| 5,889,306 A | 3/1999 | Christensen et al. |
| 6,121,659 A | 9/2000 | Christensen et al. |
| 6,264,108 B1 | 7/2001 | Baentsch |
| 6,396,400 B1 | 5/2002 | Epstein, III et al. |
| 7,005,733 B2 | 2/2006 | Kommerling et al. |
| 7,555,787 B2 * | 6/2009 | Clercq ............................ 726/34 |
| 2002/0199111 A1* | 12/2002 | Clark et al. ................... 713/194 |
| 2005/0218401 A1* | 10/2005 | Marinet et al. .................. 257/48 |
| 2005/0274630 A1* | 12/2005 | Clark et al. ..................... 206/1.5 |
| 2007/0029384 A1* | 2/2007 | Atherton ........................ 235/435 |
| 2008/0000988 A1* | 1/2008 | Farooq et al. ................. 235/492 |
| 2008/0251906 A1* | 10/2008 | Eaton et al. ................... 257/686 |
| 2008/0260150 A1* | 10/2008 | De Clercq ..................... 380/255 |
| 2009/0146270 A1* | 6/2009 | Buer et al. ..................... 257/659 |
| 2010/0026313 A1* | 2/2010 | Bartley et al. ................. 324/548 |
| 2010/0026506 A1* | 2/2010 | Bartley et al. ................. 340/657 |

* cited by examiner

*Primary Examiner* — George A Bugg
*Assistant Examiner* — Bradley E Thompson
(74) *Attorney, Agent, or Firm* — Toler Law Group

(57) ABSTRACT

An apparatus and method detect microchip tampering by including a capacitance circuit that comprises a protective cover. Dielectric material may be sandwiched between the cover and a backside metal layer, which may be proximate a protected surface of the microchip. Changes in the capacitance of the above circuit caused by alteration of the cover or other component of the capacitance circuit may be sensed and prompt defensive action.

20 Claims, 4 Drawing Sheets

CAPACITANCE-BASED MICROCHIP EXPLOITATION DETECTION

RELATED APPLICATIONS

The present application relates to co-pending U.S. patent applications entitled "Signal Quality Monitoring to Defeat Microchip Exploitation" Ser. No. 12/181,352, "False Connection for Defeating Microchip Exploitation" Ser. No. 12/181,367, "Interdependent Microchip Functionality for Defeating Exploitation Attempts" Ser. No. 12/181,367, "Capacitance Structures for Defeating Microchip Tampering" Ser. No. 12/181,365, "Resistance Sensing for Defeating Microchip Exploitation" Ser. No. 12/181,387, "Continuity Check Monitoring for Microchip Exploitation Detection" Ser. No. 12/181,357, and "Doped Implant Monitoring for Microchip Tamper Detection" Ser. No. 12/181,401, all of which are filed concurrently herewith and which are incorporated by reference in their entireties.

FIELD OF THE INVENTION

The present invention relates generally to microchip technologies, and more particularly, to protecting the circuitry and content of microchips.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessor chips) and for computer memory (memory or Random Access Memory chips). Microchips are also made that include both logic and memory, and for special purposes, such as signal, graphics and other processing applications.

An advanced method of reverse engineering select microchip components uses high energy photons, electrons or ions. Focused ion beam (FIB) processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers occasionally impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, FIB, or even simple infrared observation. Sophisticated exploitation techniques overcome conventional obstacles by removing the bulk silicon and metallized back layer. For instance, reverse engineering processes may grind away the metallized portion towards implementing a successful FIB operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved method, and apparatus for protecting a microchip from tampering. In one aspect of the invention, an apparatus comprises a microchip and a capacitance circuit that includes a cover positioned over the microchip. Alteration of the cover affects a capacitance produced by the capacitance circuit. Embodiments also include a sensing circuit configured to measure the capacitance of the capacitance circuit and to generate a signal associated with the measured capacitance. A defensive circuit may be configured to initiate in response to the generated signal an action for obstructing analysis of the microchip.

According to another aspect of the invention, the capacitance circuit includes a backside layer positioned proximate the microchip and the cover. The capacitance circuit may further include a dielectric material positioned in between the cover and the backside layer.

Where so configured, an electrical field may be present between the cover and the backside layer. The sensing circuit and the cover or backside layer may be in electrical communication with one another. Electrical communication may include a physical connection, a sequence of physical and/or remote connections, or merely a proximity within which an electrical property may be detected. For example, the capacitance circuit may include circuit traces in the microchip carrier and wirebond connections electrically connecting the cover to the backside layer. Alternatively or additionally, the capacitance circuit may include a through-silicon via electrically connecting the sensing circuit to the backside layer.

In one embodiment, the defensive circuit is incorporated within the microchip. In another or the same embodiment, the sensing circuit is incorporated within the microchip. Where so configured, the microchip comprises a flip chip.

The sensing circuit may be configured to generate and sense a signal used to measure the capacitance. The sensing circuit may be configured to measure the capacitance of the capacitance circuit over a period of time. The action for obstructing analysis of the microchip may include at least one of a self-destructing, obscuring and spoofing function. The sensing and/or defensive circuits may comprise program code. Aspects of the invention may include a machine/computer readable medium bearing the program code.

According to another aspect of the invention, an embodiment protects a microchip from tampering by measuring a capacitance of a capacitance circuit comprising a cover positioned over the microchip, wherein alteration of the cover affects a capacitance produced by the capacitance circuit. A signal associated with the measured capacitance may be generated. In response to the generated signal, an action for obstructing analysis of the microchip may be initiated.

In another embodiment that is consistent with the underlying principles of the present invention, a backside layer may be positioned proximate the microchip and in electrical communication with the cover. An electrical connection may be provided between the sensing circuit and the cover or the backside layer. The electrical connection may include a wirebond connection and/or a through-silicon via. Dielectric material may be positioned in between the cover and the backside layer.

According to another aspect of the invention, processes may detect microchip tampering by measuring a capacitance of a capacitance circuit comprising a cover positioned over the microchip, wherein alteration of the cover affects a capacitance produced by the capacitance circuit. A signal associated with the measured capacitance may be generated.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Figure 1:
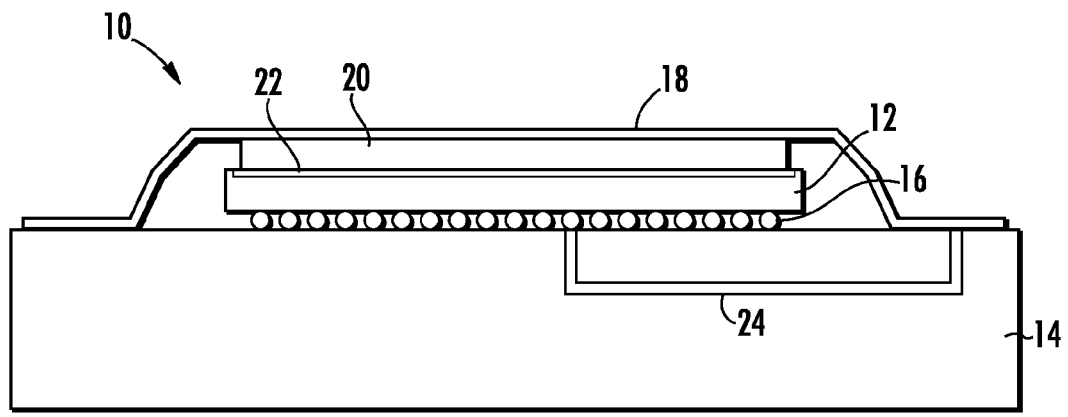
FIG. 1 shows an integrated circuit assembly having a cover and backside layer comprising a capacitance circuit in accordance with the underlying principles of the present invention.

Embodiments consistent with the underlying principles of the present invention detect microchip tampering by including a capacitance circuit that comprises a protective cover. Dielectric material may be positioned between the cover and a backside metal layer, which may be proximate a protected surface of the microchip. Changes in the capacitance of the above circuit caused by alteration of the cover or other component of the capacitance circuit may be sensed and prompt defensive action.

The capacitance circuit may connect to the capacitance sensing circuitry within the microchip for sensing a tamper event. The dielectric material included within the capacitance circuit may be positioned between the cover and the backside layer proximate the backside of the microchip. The dielectric material typically comprises a thermal interface material, thermal paste, or another stable dielectric, such as epoxy.

In one embodiment, an impulse may be sent to the capacitance circuit from the active circuitry comprising sensing circuitry in the microchip. The impulse response may be measured by a capacitive divider at a pulse generator of the capacitance sensing circuitry. The measured response characteristics may be compared to known, expected results. Deviations of sufficient magnitude may trigger an output signal. The output signal may initiate a defensive action, such as a self-destruct or shutdown function on the microchip.

Aspects of the invention in this manner foil attempts to exploit conventional integrated circuit safeguards. Such a tamper resistant mechanism may include a continuity test for the presence of a cover, or lid. Such a safeguard may be defeated by shorting the pads together on the microchip substrate. Another exploitation technique calls for removing only a center portion of the lid, leaving a continuous path around the edges. Both such tampering techniques are frustrated by embodiments of the invention, which account for precise capacitance measurements that depend upon the integrity of the cover.

One capacitive embodiment consistent with the principles of the invention includes a capacitor formed with a conventional cover positioned proximate a microchip. A backside layer of metal plating may be deposited on the back of the microchip. The backside layer may be held at the potential of the bulk silicon (substantially at ground), and the cover may be used to drive a pulse used to measure capacitance.

In another embodiment, a capacitance circuit is again formed with a standard cover positioned over a microchip and metal plating deposited on the back of the microchip. Wirebonds may be used to connect from pads on the microchip carrier to the metal plating on the back of the microchip. The metal plating, or backside layer, positioned on the back of the microchip may be used to drive the sense pulse used to measure capacitance.

Still another embodiment includes a capacitor formed with a microchip cover and a backside layer of metal plating deposited on the back of the microchip. Through-silicon vias may be used to connect the active circuitry on the microchip to the backside layer comprising the metal plating on the back of the microchip. A through-silicon via is a type of via that generally comprises a vertical electrical connection passing through a silicon wafer or die for the purpose of creating three-dimensional packages and circuits. The backside layer may be used to drive the sense pulse used to measure capacitance.

FIG. 1 shows an apparatus comprising an integrated circuit assembly 10. The assembly 10 more particularly shows a flip chip integrated circuit structure. Flip chip mounting typically uses die bumps, e.g., solder, instead of wirebonds. The die bumps are deposited on the microchip pads, which are located on the top side of the wafer during the final wafer processing step. In order to mount the microchip to external circuitry (on a circuit board or another wafer or a microchip), the microchip is flipped around so that the topside faces down the mounting area. The die bumps are used to connect directly to the associated external circuitry. Other embodiments consistent with the invention may use wirebonds, as are known in the art.

Turning more particularly to FIG. 1, the assembly 10 includes a microchip 12. The microchip 12 may include bulk silicon substrate, as is known in the art. The microchip 12 mounts onto a microchip carrier 14 via die bumps 16. The microchip carrier 14 generally comprises the package in which the microchip 12 is mounted for plugging into (socket mount) or soldering onto (surface mount) a printed circuit board.

A protective cover 18 is layered over all or a portion of the integrated circuit, or microchip 12. The cover 18 typically comprises metal, but may include another material suited and positioned to impede access to the microchip 12. In addition to protecting the microchip 12, the cover 18 is positioned over a dielectric fill material 20 and a backside layer 22. Typical dielectric material may include virtually any insulating material, including solids, liquids, or gases, in addition to vacuum space. A typical dielectric may include thermal paste.

The backside layer 22 typically comprises copper or tungsten, however, it may include other suitable metal or other material suitable for functioning within a capacitance circuit. The backside layer 22 may be sputtered or otherwise applied onto the microchip 12 or dielectric material 20. The backside layer 22 may be around two mils in thickness in one example.

The cover 18, dielectric material 20 and backside layer 22 comprise a capacitor, or the capacitance circuit. Sensing circuitry present within the active circuitry in the microchip 12 may send and receive pulses to monitor the capacitance of the capacitance circuit. Of note, the capacitance monitored by the sensing circuitry will change anytime the cover 18, dielectric material 20 and/or backside layer 22 are grounded, removed, replaced, repositioned or otherwise altered.

The cover 18 may attach to the microchip carrier 14. The cover 18 may be said to be electrically floating in that it may be ungrounded. A connection 24 may electrically connect a die bump 16 to the cover 18, completing the capacitive circuit. The connection 24 typically comprises copper running through the microchip carrier 14. The connection 24 may be used to communicate pulses via the die bump(s) 16 to and from active circuitry present within the microchip 12. Active circuitry may comprise the physical region of a microchip that contains the transistors, resistors and capacitors, which perform computing and storage operations. Only a few micrometers thick, the active region lies within the border of pads to which are bonded the wires that connect the microchip to the microchip package and then the circuit board.

The capacitive coupling of the backside layer 22 with the cover 18 forms a capacitor based on: $C = E \cdot A/d$. In the foregoing equation, E is the dielectric constant ($\epsilon_0 \cdot \epsilon_r$), A is the area over which the conductors are coupled, and d is the thickness of the dielectric material. The cover 18 may be held at ground and a pulse may be sent to check capacitance. Ground generally refers to the reference point in an electrical circuit from which other voltages are measured.

As such, the capacitance circuit comprises a passive electronic component that stores energy in the form of an electrostatic field. The capacitance is directly proportional to the surface areas of the cover 18 and backside layer 22, and is inversely proportional to the separation between them. Capacitance also depends on the dielectric constant of the dielectric or other material separating the cover 18 and backside layer 22.

Figure 2:
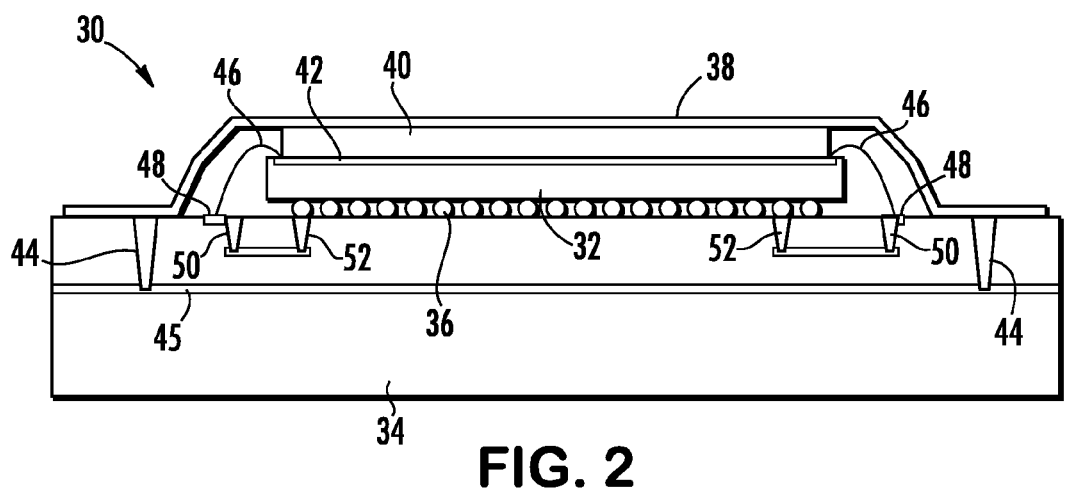
FIG. 2 shows an integrated circuit assembly having a cover and backside layer in electrical communication via wirebond connections and comprising a capacitance circuit in accordance with the underlying principles of the present invention.

FIG. 2 shows an integrated circuit assembly 30 having a microchip 32 that mounts onto a microchip carrier 34 using die bumps 36. The assembly includes wirebond connections 46 that connect a backside layer 42 to pads 48 on the microchip carrier 34. A cover 38 protects the microchip 32, in addition to dielectric material 40 and the backside layer 42. The cover 38 may be grounded using a via 44 and a grounded conductive plane 45. As above, the cover 38 may comprise any material capable of functioning within a capacitance circuit and that shields or otherwise guards the microchip 32 from unwanted inspection.

The wirebond connection 46 may connect the backside layer 42 to the pad 48 to establish part of the capacitive circuit. The pad 48 may be in electrical communication with a via 50. The via 50 may connect to another via 52, which may communicate with a die bump 36. As known by one of skill in the art, the die bump 36 may communicate with active circuitry/devices inside the microchip 32. A via 52 may include a hole that is electroplated to make a connection. The via 52 may complete the capacitive circuit with the (solder) die bump 36, which connects to the active circuitry of the microchip 32. Because the cover 38 is grounded, it may function as a reference. The backside layer 42 may be driven to selectively achieve different voltages.

The cover 38, dielectric material 40 and backside layer 42 may comprise the capacitance circuit. Sensing circuitry present within the active circuitry in the microchip 32 may send and receive pulses to monitor the capacitance of the capacitance circuit. Of note, the capacitance monitored by the sensing circuitry will change anytime the cover 38, dielectric material 40, backside layer 42 or other component of the capacitance circuit are altered.

Figure 3:
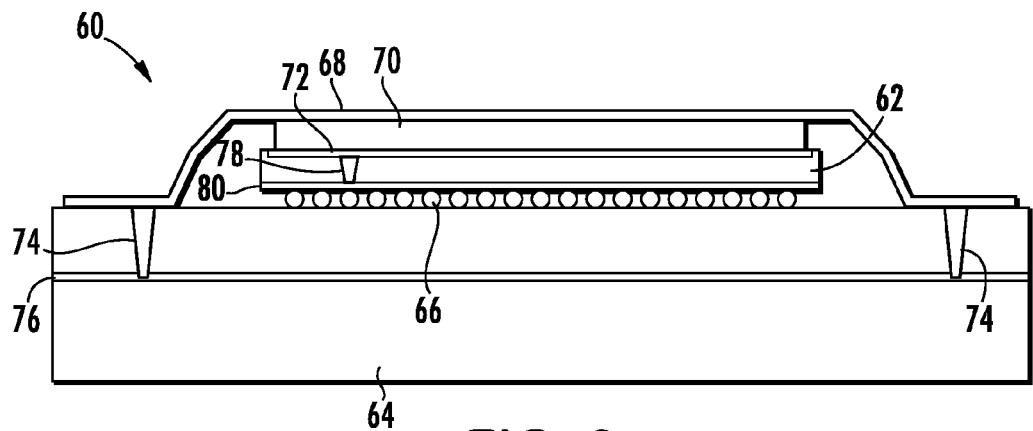
FIG. 3 shows an integrated circuit assembly having a cover and backside layer connected using through-silicon vias and comprising a capacitance circuit in accordance with the underlying principles of the present invention.

FIG. 3 shows an integrated circuit assembly 60 that includes a microchip 62 connected to a microchip carrier 64 using die bumps 66. Through-silicon via(s) 78 connect a backside layer 72 to pulse generating and sensing circuitry. A cover 68 protects the microchip 62 from physical tampering, as well as provides part of a capacitance circuit used to sense an exploitation attempt. The protective cover 68 is also positioned over a dielectric filler material 70 and the backside layer 72. The cover 68, dielectric material 70 and backside layer 72 form the capacitance circuit.

The cover 68 may be grounded by a via 74 in the microchip carrier 64 to a conductive plane 76. The through-silicon via 78 may electrically connect the backside layer 72 to the active circuitry 80 of the microchip 62. In this manner, the active circuitry 80 may sense a change in the capacitance circuit that warrants defensive action.

Figure 4:
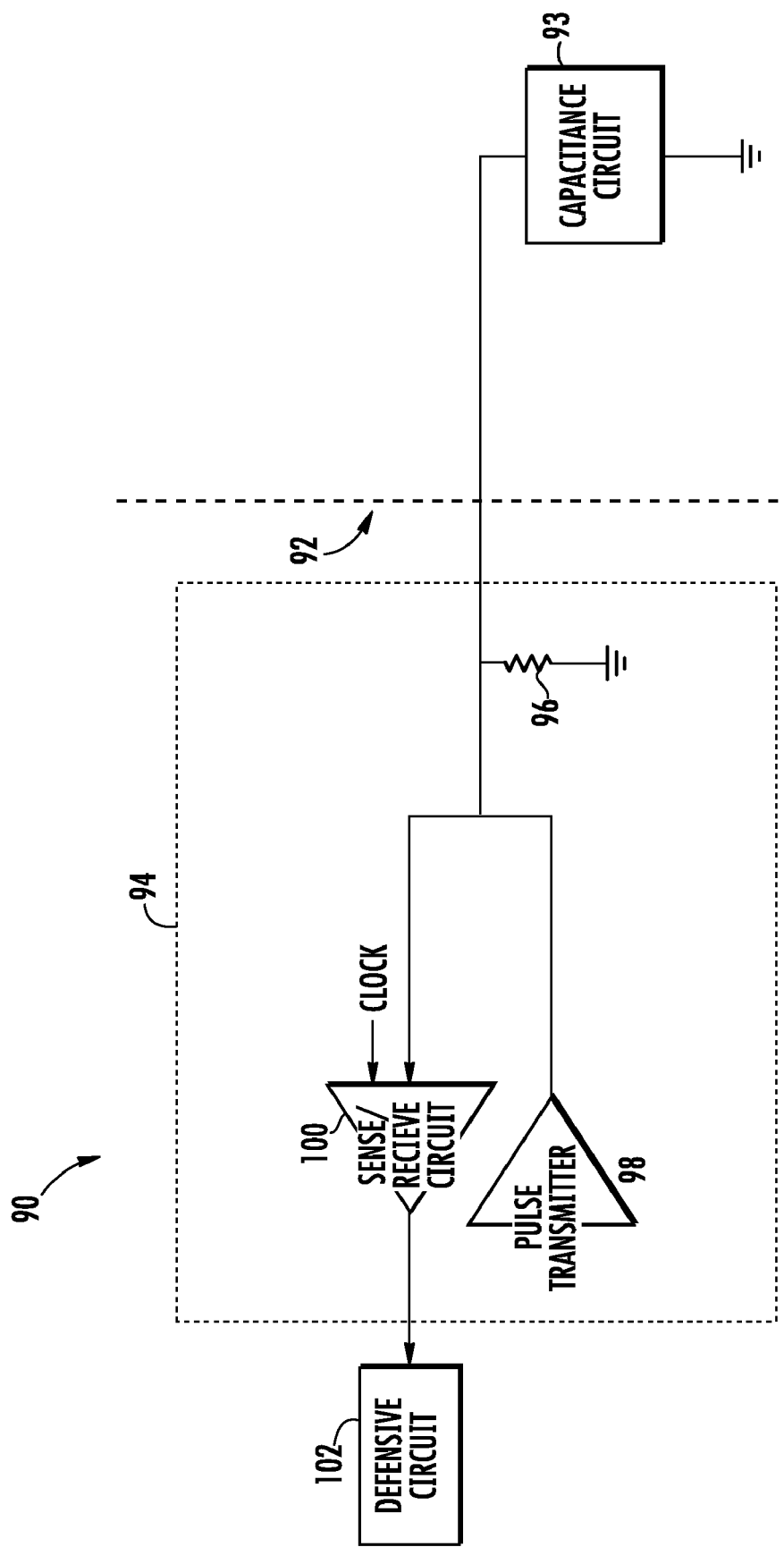
FIG. 4 shows a block diagram that includes a capacitance circuit and a sensing circuit for measuring the capacitive load for an integrated circuit assembly, such as shown in FIGS. 1-3.

FIG. 4 is a block diagram showing a system 90 for detecting and addressing tampering within an integrated circuit assembly 10 consistent with embodiments of the present invention. More particularly, the system 90 includes a capacitance circuit 93 and a sensing circuit 94 for measuring the capacitive load.

The capacitance circuit 93 may comprise a protective cover 18, dielectric material 20 and backside layer 22, as discussed herein. Dashed line 92 may represent a microchip boundary and may correspond to a die bump 16.

Dashed block designates circuitry 94 that comprises a sensing circuit 94. The sensing circuit 94 includes a resistor 96 to complete part of the load of the resistor-capacitor (RC) load. An exemplary value of the resistor 96 may include one kilohm. The sensing circuit 94 also includes a pulse transmitter 98, which may generate voltage used in determining capacitance. The generated pulse may travel to the capacitance circuit 93 to create a characteristic electrical response that is monitored by the pulse receiver 100.

The sensing circuit 94 may send a pulse to a driving plate of the capacitance circuit 93, e.g., either the cover 18 or the backside layer 22, depending upon the embodiment. The pulse may follow a known reflection pattern based on the load characteristics. As shown in FIG. 4, the receiver circuit 100 is associated with a clock. The receiver circuit 100 may also be designed with a known threshold voltage (Vt). As such, the sensing circuit 94 may determine the voltage level after a pre-defined time delay. Alternatively, the sensing circuit 94 may determine the amount of time it takes for the circuit to achieve a pre-defined voltage level.

As such, the pulse receiver 100 may include circuitry configured to compare the received pulse over time to some threshold voltage or other value. Should the threshold value be met, the pulse receiver 100 may send a signal to defensive circuitry 102. The defensive circuitry 102 may be configured to initiate a defensive action, such as a self-destructing, obscuring or spoofing function.

Figure 5:
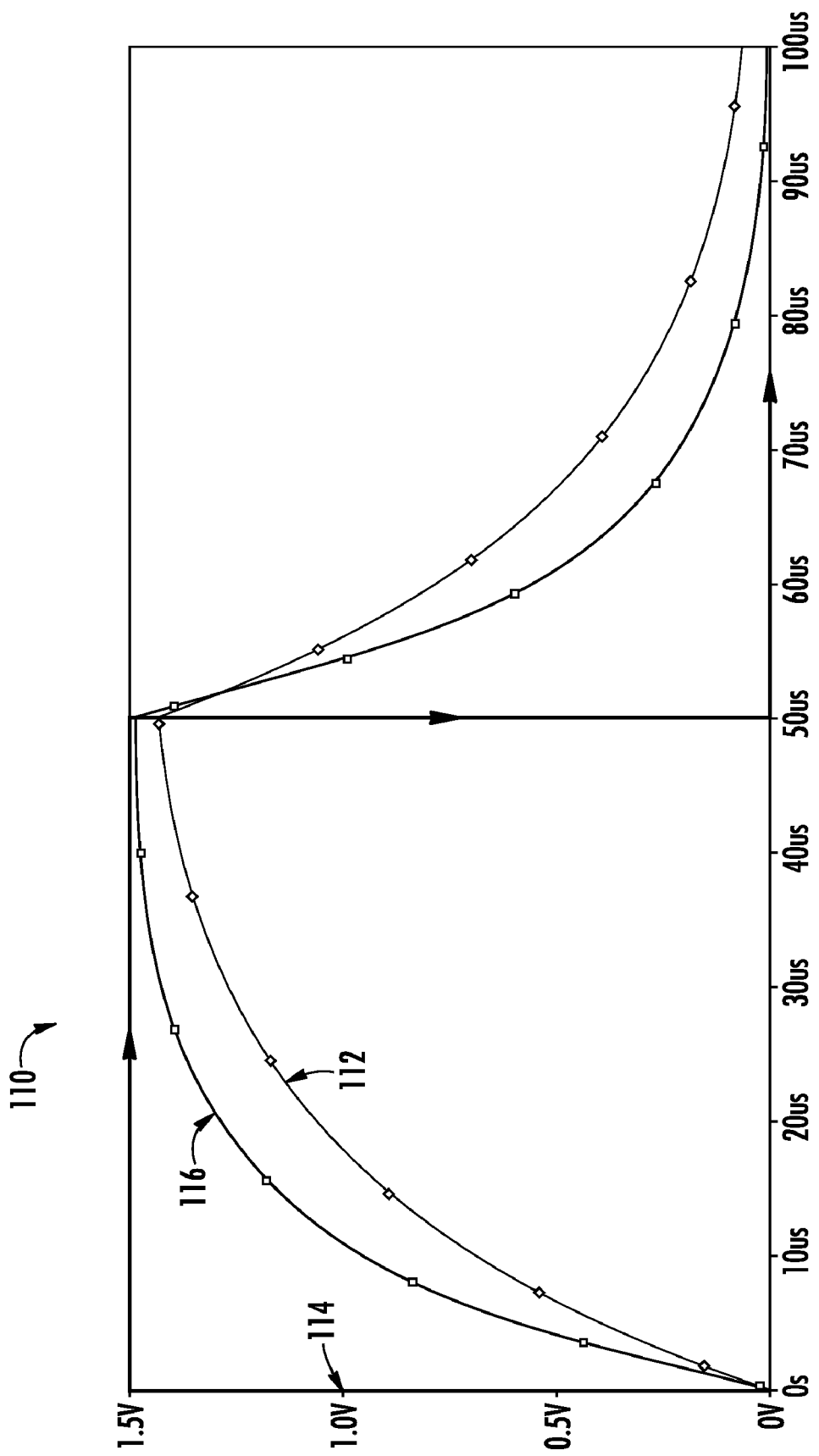
FIG. 5 shows a graph of a capacitive load measured at a sensing circuit, such as is shown in FIG. 4.

FIG. 5 shows a graph 110 of a capacitive load measured at a sensing circuit, such as is shown in FIG. 4. The x-axis of the graph 110 includes set values measured in microseconds. The y-axis of the graph shows increments measured in voltage. Plotted curve 112 shows a known, stored curve that is produced when the cover 18 is in place and the reflected trace follows the expected pattern. Graph path 114 shows a detected curve where the capacitance circuit comprising the cover 18, dielectric material 20 and backside layer 22 has been destroyed. For instance, the cover 18 has been removed, the dielectric material may have been changed, and/or the backside layer 22 has been ground off.

Curve 116 corresponds to an instance where the capacitance circuit properties differ from the expected ones associated with the original construction. Such measurements may indicate that the cover 18 and/or the backside layer 22 have been ground down, or that the dielectric material 20 has been altered. As such, the time constant of the RC circuit will be different from the expected time constant, causing the appropriate trigger to the sensing circuit 94.

Turning more particularly to curve 116, the thickness of the dielectric material 20 in the capacitance equation has been changed from six mils to ten mils. This dimension is a function of the thermal interface material, pressure applied during lid assembly and assembly temperature. Typical tolerances on this dimension are plus or minus three mils. The sensed difference between paths 112 and 116 may satisfy some threshold margin that prompts defensive action. Such a tolerance may be exceeded when a reverse engineering process removes a cover 18 and/or dielectric material, then tries to replace it. It would be extremely difficult to replace the cover 18, dielectric material 20 and/or backside layer 22 in such a manner that could achieve the nearly identical threshold of measured capacitance difference.

Figure 6:
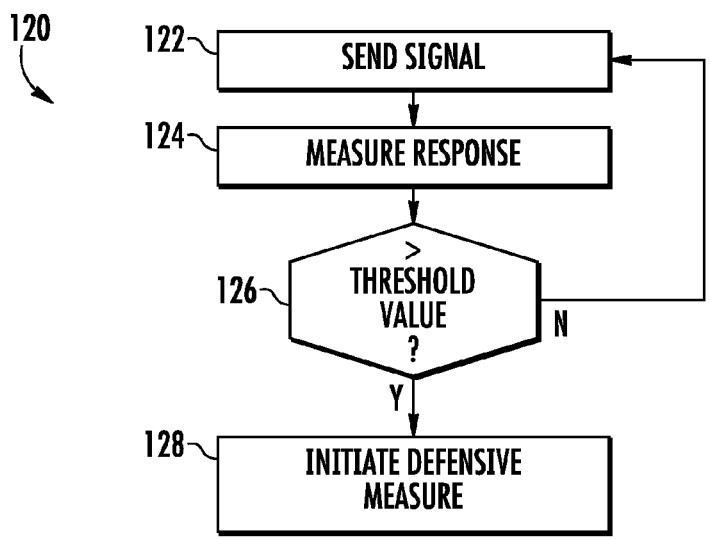
FIG. 6 shows a flowchart having processes executable by the integrated circuit assembly shown in FIG. 1 for detecting tampering in accordance with the underlying principles of the present invention.

FIG. 6 is a flowchart 120 having processes executable by the integrated circuit assembly 10 shown in FIG. 1 for detecting tampering in accordance with the underlying principles of the present invention. Turning more particularly to the steps of the flowchart 120, the system 90 may generate and send to the capacitance circuit 93 at block 122 a pulse signal using the pulse transmitter 98 from active circuitry 80 in the microchip 62.

At block 124 of FIG. 6, the signal response may be measured by the capacitance sensing circuit 94. The system 90 may then determine at block 126 if the measured response exceeds a known threshold value. If not, then the system 90 may continue to monitor capacitance as before.

If the measured voltage exceeds the preset threshold value at block 126, then the system 90 may generate at block 128 a signal configured to initiate defensive processes.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of machine/computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, machine/computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one, or any number of locations.

Those skilled in the art will further recognize that the exemplary environments illustrated in FIGS. 1-4 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus, comprising:
   a microchip;
   a capacitance circuit comprising a cover positioned over the microchip and a backside layer positioned proximate the microchip, wherein alteration of the cover affects a capacitance produced by the capacitance circuit;
   a sensing circuit configured to measure the capacitance of the capacitance circuit and to generate a signal associated with the measured capacitance; and
   a defensive circuit configured to initiate in response to the generated signal an action for obstructing analysis of the microchip.

2. The apparatus of claim 1, wherein the capacitance circuit includes a dielectric material positioned in between the cover and the backside layer.

3. The apparatus of claim 1, wherein the capacitance circuit includes a wirebond connection electrically connecting the sensing circuit to the backside layer positioned proximate the microchip.

4. The apparatus of claim 1 further comprising an electrical connection between the sensing circuit an the cover.

5. The apparatus of claim 1, wherein the capacitance circuit includes an electrical connection between the sensing circuit and the cover comprised of conductive traces and vias in the microchip.

6. The apparatus of claim 1, wherein the defensive circuit is incorporated within the microchip.

7. The apparatus of claim 1, wherein the sensing circuit is incorporated within the microchip.

8. The apparatus of claim 1, wherein the measured capacitance deviates from an expected capacitance.

9. The apparatus of claim 1, wherein the sensing circuit is further configured to generate and sense a signal used to measure the capacitance.

10. The apparatus of claim 1, wherein the action includes at least one of a self-destructing, obscuring and spoofing function.

11. The apparatus of claim 1, wherein the microchip comprises a flip chip.

12. The apparatus of claim 1, wherein at least one of the sensing and defensive circuits further executes program code and a computer readable medium bearing the program code.

13. The apparatus of claim 1, wherein the sensing circuit is configured to measure the capacitance of the capacitance circuit over a period of time.

14. A method of protecting a microchip from tampering, the method comprising:
    measuring a capacitance of a capacitance circuit comprising a cover positioned over the microchip, wherein alteration of the cover affects a capacitance produced by the capacitance circuit;
    positioning, a backside layer proximate the microchip;
    generating, a signal associated with the measured capacitance; and
    initiating in response to the generated signal an action for obstructing analysis of the microchip.

15. The method of claim 14 further comprising providing an electrical connection between the sensing circuit and the backside layer.

16. The method of claim 14 further comprising connecting the sensing circuit and the backside layer using at least one of a wirebond connection and a through-silicon via.

17. The method of claim 14 further comprising positioning a dielectric material in between the cover and the backside layer.

18. A method of detecting microchip tampering, the method comprising:
    measuring a capacitance of a capacitance circuit comprising a cover positioned over the microchip and a backside layer positioned proximate the microchip, wherein alteration of the cover affects a capacitance produced by the capacitance circuit, and
    generating a signal associated with the measured capacitance.

19. The method of claim 18 further comprising providing an electrical connection between the sensing circuit and the backside layer.

20. The method of claim 18 further comprising positioning dielectric material in between the cover and the backside layer.

* * * * *